United States Patent
Oshima et al.

(10) Patent No.: US 8,705,074 B2
(45) Date of Patent: Apr. 22, 2014

(54) PROCESSING DEVICE AND PROCESSING METHOD

(75) Inventors: Yasuhiro Oshima, Nagano (JP);
Hirotaka Akamatsu, Nagano (JP);
Yasuhiro Furuta, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/597,842

(22) Filed: Aug. 29, 2012

(65) Prior Publication Data

US 2013/0050739 A1 Feb. 28, 2013

(30) Foreign Application Priority Data

Aug. 31, 2011 (JP) ................................. 2011-188625
Aug. 31, 2011 (JP) ................................. 2011-188626
Sep. 14, 2011 (JP) ................................. 2011-200268

(51) Int. Cl.
*G06F 15/00* (2006.01)
*G06K 1/00* (2006.01)
*G06K 15/00* (2006.01)
*G06F 3/12* (2006.01)

(52) U.S. Cl.
USPC ........................................ 358/1.14; 358/1.15

(58) Field of Classification Search
None
See application file for complete search history.

(56) References Cited

U.S. PATENT DOCUMENTS

| | | | |
|---|---|---|---|
| 5,592,683 A | 1/1997 | Chen et al. | |
| 2007/0026854 A1* | 2/2007 | Nath et al. | 455/423 |
| 2008/0068646 A1 | 3/2008 | Kobayashi | |
| 2010/0049785 A1* | 2/2010 | Stoyanov et al. | 709/203 |

FOREIGN PATENT DOCUMENTS

| | | |
|---|---|---|
| JP | 03-224778 A | 10/1991 |
| JP | 2006-243884 A | 9/2006 |
| JP | 2008-071257 A | 3/2008 |

* cited by examiner

*Primary Examiner* — Douglas Tran
(74) *Attorney, Agent, or Firm* — Global IP Counselors, LLP (57) ABSTRACT

A processing device has a requesting section that issues a request to transmit processing data to a server; a receiving section that receives the processing data transmitted from the server in response to the request; a processing section that sequentially makes the received processing data a processing object, and conducts processing based on the processing data that is made a processing object; and a measuring section that measures a data amount of the processing data that has been made a processing object among the received processing data. In a case where a session between the server is disconnected before all the processing data is made a processing object and thereafter the session is reconnected, the processing section conducts processing with respect to a portion that is not yet made a processing object based on the data amount have measured when the server is disconnected.

11 Claims, 9 Drawing Sheets

| Error Code | Content of Error | Classification |
|---|---|---|
| E1 | No Printing Medium | First Group |
| E2 | No Color Material | First Group |
| E3 | Type Mismatch Of Printing Medium | First Group |
| E4 | Open Cover | First Group |
| E5 | Printing Medium Jam | Second Group |
| E6 | Mechanical Abnormality | Second Group |
| E7 | Power Outage | Second Group |
| E8 | Waste Liquid Overflow | Second Group |

PROCESSING DEVICE AND PROCESSING METHOD

CROSS-REFERENCE TO RELATED APPLICATIONS

This application claims priority to Japanese Patent Application No. 2011-188625 filed on Aug. 31, 2011, Japanese Patent Application No. 2011-188626, filed on Aug. 31, 2011, and Japanese Patent Application No. 2011-200268, filed on Sep. 14, 2011. The entire disclosure of Japanese Patent Application Nos. 2011-188625, 2011-188626 and 2011-2011-200268 is hereby incorporated herein by reference.

BACKGROUND

1. Technical Field

The present invention relates to a processing device and a processing method that executes processing corresponding to a processing request acquired from a user via a server in a cloud computing system.

2. Background Technology

A cloud computing system has been known, which provides service for causing a specified printer to conduct printing by e-mail transmission (for example, Patent Document 1). This cloud computing system (hereinafter, referred to as printing system) has a server, and when the server receives specified e-mail, the server generates print data corresponding to a specified printer based on the e-mail. The specified printer registered in the server acquires print data from the server and conducts printing. Accordingly, a user of the printing system can use a printer that is registered in the printing system even if a printer driver is not installed in a communication terminal such as a PC (personal computer) or a smartphone.

Japanese Laid-open Patent Application No. 2008-71257 (Patent Document 1), is an example of the related art.

SUMMARY

Problems to Be Solved by the Invention

In this printing system, the server generates print data based on the e-mail transmitted by a user, and notifies the printer of presence of a print job. The notified printer conducts printing while acquiring the print data by requesting the server to transmit the print data. Since the size of the memory installed in the printer has a limitation in terms of the cost, a portion of print data in which printing has been completed is deleted from the memory so as to create a memory region for a portion of print data to be processed next. In this manner, the printer conducts printing while acquiring the print data. In a case where an error occurs in the printer while acquiring the print data, however, printing cannot be continued and the print data cannot be deleted from the memory. Eventually, the print data subsequently transmitted cannot be received.

In such a case, according to a well-known operation, printing is terminated due to the occurrence of an error, and an operation after recovery from the error is not particularly considered. This is not limited to printing, and the same can be said for other processing. The advantage of the invention is to provide a processing device that can efficiently restart processing in a case where the session between the processing device and the server is disconnected during the acquisition of the data and thereafter a reconnection is established.

Means Used to Solve the Above-Mentioned Problems

In order to achieve the above-described advantage, a processing device has a requesting section; a receiving section; a processing section; and a measuring section. The requesting section issues a request to transmit processing data to a server. The receiving section receives processing data transmitted from the server in response to the request to transmit. The processing section sequentially makes the processing data received by the receiving section a processing object, and conducts processing based on the processing data that has been made a processing object. The measuring section measures a data amount of the processing data that has been made a processing object by the processing section among the received processing data. Specifically, every time the processing data requested to be transmitted and received in sequence by a predetermined size is sequentially made a processing object by the processing section, the measuring section measures an accumulated data amount (size) thereof.

According to the processing device of the invention, in a case where the session between the server is disconnected before all the processing data is made a processing object and thereafter a reconnection is established, the processing section conducts processing with respect to a first portion that is not yet made a processing object among the processing data based on the data amount measured by the measuring section after the session is reconnected, and does not conduct processing with respect to a second portion that is already made a processing object among the processing data. Specifically, processing is not conducted again with respect to the portion in which processing has been completed, but processing is conducted with respect to the portion in which reception has been completed but processing has not been completed, which makes it possible to efficiently conduct processing. Alternatively, in a case where the session between the server is disconnected before all the processing data requested to the server is made a processing object of the processing section and thereafter a reconnection is established, the requesting section issues a request to transmit the portion of the processing data that is not yet made a processing object among the processing data based on the data amount measured by the measuring section after the session is reconnected. Specifically, the requesting section does not issue a request to transmit the portion that is already made a processing object of the processing portion and issues a request to the server to transmit the portion that is not yet made a processing object. Alternatively, in a case where the session between the server is disconnected before all the processing data requested to the server is made a processing object of the processing section and thereafter a reconnection is established, the processing section extracts a portion of the processing data that is not yet made a processing object of the processing section among the processing data based on the data amount measured by the measuring section from the processing data received by the receiving section in response to the request to transmit the processing data issued again by the requesting section, and makes the portion of the processing data a processing object. Specifically, the processing section does not make the portion that is already made a processing object of the processing section among the received processing data a processing object of the processing section again, but extracts a portion that is not yet made a processing object and makes the portion a processing object. It is thus possible to prevent processing from being conducted again to a portion of the processing data that is already processed or a portion of the processing data during processing before processing for converting the processing data into a form suitable for the processing device to conduct processing. Specifically, even if the session is disconnected and reconnected, the processing can be restarted where the processing has been ceased. It is thus possible to prevent consumable goods such as ink or a printing medium from being wasted in a case of print processing. Also, since the processing is restarted where the processing has been ceased, the time required for the processing to be completed can be shortened compared to a case where processing is conducted again from the beginning.

Further, in the processing device to achieve the above-described advantage, in a case where the processing data received after the session is reconnected is a portion that is not yet made a processing object of the processing section, the processing section can make the portion of the processing data a processing object. In a case where the processing data received after the session is reconnected includes a portion that is already made a processing object and a portion that is not yet made a processing object, the processing section can extract the portion of the processing data that is not yet made a processing object from the received processing data based on the data amount measured by the measuring section, and make the portion a processing object.

Specifically, in a case where the server corresponds to a function of requesting to transmit part of processing data by the processing device, the server transmits a portion of the processing data that is not yet made a processing object as requested by the processing device, and thus the portion of the processing data is made a processing object. On the other hand, in a case where the server does not correspond to a function of requesting to transmit part of processing data, the server transmits the entire processing data included in a processing job including a portion that is already made a processing object and a portion that is not yet made a processing object. Even in such a case, according to the invention, it is possible to extract a portion that is not yet made a processing object and make the portion a processing object of the processing section. Consequently, whether or not the server corresponds to a function of requesting to transmit part of processing data, the processing device can restart processing where the processing has been ceased, which makes it possible to prevent consumable goods such as ink or a printing medium from being wasted. Also, since processing is restarted where the processing has been ceased, the time required for the processing to be completed can be shortened compared to a case where processing is conducted again from the beginning.

In the processing device to achieve the above-described advantage, the receiving section can cause a first storing section to store the received processing data. In this case, the processing section can conduct processing before processing to the processing data stored in a second storing section as a processing object, and conduct processing based on the data after processing before processing. In this case, the measuring section can measure a data amount of the processing data forwarded from the first storing section to the second storing section.

In a case where the processing device has the first storing section that stores processing data received from the server once, and the second storing section that is a storing region of processing data for processing before processing, it is necessary to conduct processing that transfers processing data from the first storing section to the second storing section so as to conduct processing before processing. By measuring a data amount of the processing data transferred from the first storing section to the second storing section in synchronization with the processing, it is possible to achieve measurement of a "data amount of the processing data made a processing object by the processing section".

Further, in the processing device to achieve the above-described advantage, the requesting section can issue a request to transmit the portion of the processing data that is not yet made a processing object through range specification by using a range header of HTTP.

By using a range header of HTTP, it is possible to achieve a request to transmit part of the processing data.

Another processing device to achieve the above-described advantage has a requesting section; a receiving section; and a processing section. The requesting section issues a request to transmit processing data to a server. The receiving section receives processing data transmitted from the server in response to the request to transmit. The processing section sequentially acquires the received processing data, and conducts processing by using the processing data. In a case where the processing section ceases to acquire the processing data before the acquisition of the processing data is completed and thereafter the acquisition of the processing data is restarted, the requesting section issues a request to transmit as follows. Specifically, the requesting section issues a request to transmit a portion that is not yet acquired by the processing section among the entire data in a case where the reason why the acquisition of the processing data is ceased is classified into a first group. The requesting section issues a request to transmit the entire data in a case where the reason why the acquisition of the processing data is ceased is classified into a second group.

Here, the reason classified into the first group can include the occurrence of the following event. Specifically, it is the occurrence of an event in which restarting ceased processing where the processing has been ceased is preferred after the event that is the reason for the cease is solved. The reason classified into the second group can include the occurrence of the following event. Specifically, it is the occurrence of an event in which conducting ceased processing again from the beginning is preferred after the event that is the reason for the cease is solved. The groups into which the reason for the cease (event that is the reason for the cease) is classified are determined in advance in the data processing device.

According to the invention, therefore, when the acquisition of the processing data is restarted, it is possible to switch between acquiring the entire data again and acquiring only a portion that is not yet acquired depending on the reason for the cease. As a result, in a case of the occurrence of an event in which it is determined in advance that restarting ceased processing where the processing has been ceased is preferred, the processing section can acquire the processing data that is not yet acquired, and thus the time required for the processing can be shortened compared to a configuration where the entire data including the data to which processing has been conducted is acquired again. In a case of the occurrence of an event in which it is determined in advance that conducting ceased processing again from the beginning is preferred when the processing is restarted after the cease, the processing section can acquire the entire processing data again, and thus the processing can be conducted again to the entire processing data.

In the data processing device to achieve the above-described advantage, the processing data can be print data, and the processing section can be a processing section that conducts printing based on the acquired print data. Further, the reason classified into the first group can include the occurrence of at least any one of errors including no printing medium, no color material, a type mismatch of a printing medium, and open device cover. The reason classified into the second group can include the occurrence of at least any one of errors including a printing medium jam, mechanical abnormality of the processing section, and a power outage. When various errors as described above occur and then the errors are solved, it is possible to switch between requesting to transmit the entire print data and requesting to transmit part of the print data depending on the groups into which the errors are classified.

The server to achieve the above-described advantage has a storing section; and a transmitting section. The storing section stores processing data to be processed by the data processing device. The transmitting section transmits processing data to the data processing device. In a case where the transmitting section ceases to transmit the processing data before completing transmission of the entire processing data and thereafter the transmitting section transmits the processing data again, the transmitting section transmits a portion of the processing data including a portion of the entire processing data that is not yet transmitted when the reason why the transmission of the processing data is ceased is classified into the first group, and transmits the entire processing data when the reason why the transmission of the processing data is ceased is classified into the second group.

Since the server employs the above-described configuration, when the transmission of the processing data is restarted, it is possible to switch the range of the processing data transmitted to the data processing device depending on the reason why the transmission of the processing data is ceased. Specifically, it is possible to switch between transmission of part of the processing data including a portion that is not yet transmitted and transmission of the entire processing data. The data processing device can conduct processing by using the processing data transmitted by the server.

The function of each unit described in the claims is achieved by hardware resources whose function is specified by the configuration itself, hardware resources whose function is specified by the program, or a combination thereof. Also, the function of each unit is not limited to one that is achieved by hardware resources physically independent of each other. For example, the server is not limited to one that is constructed of one computer device, and the server includes a configuration that operates as the above-described server by cooperation of a plurality of computer devices. Further, the invention can be implemented as a method, a computer program, or a recording medium for the program. The recording medium for the computer program can be a magnetic recording medium, a magneto-optical recording medium, or any recording medium that will be developed in the future.

BRIEF DESCRIPTION OF THE DRAWINGS

Referring now to the attached drawings which form a part of this original disclosure.

DETAILED DESCRIPTION OF EXEMPLARY EMBODIMENTS

Hereinafter, embodiments of the invention will be explained with reference to the attached drawings. Corresponding elements in the respective drawings have the same reference symbol, and overlapping explanations will be omitted.

1. First Embodiment 1-1. Configuration

Figure 1:
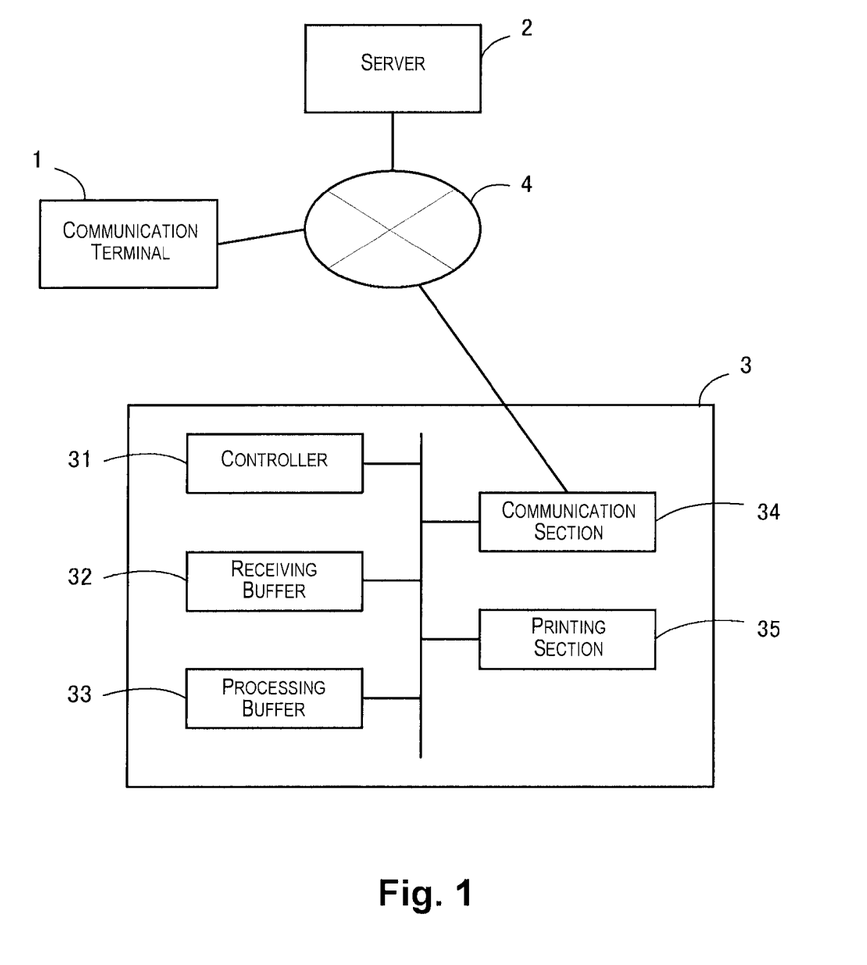
FIG. 1 is a block diagram of a printing device according to a first embodiment.

FIG. 1 is a block diagram showing a configuration of the entire printing system including a printer (printing device) 3 according to the present embodiment. In the printing system shown in FIG. 1, when an e-mail is transmitted from an optional communication terminal 1 to an e-mail address associated with the printer 3 registered in a server 2, an attached file or a body text of the e-mail is printed by the printer 3 associated with the destination e-mail address. The server 2 is constructed of one or more computers. The server 2, the printer 3, and the communication terminal 1 are connected with the Internet 4.

When the printer 3 receives notice of presence of a print job from the server 2 through an always-on connection with the server 2 using a protocol such as XMPP (Extensible Messaging and Presence Protocol), Telnet, or WebSocket, the printer 3 acquires print data from the server 2 using HTTP (Hyper Text Transfer Protocol) and executes printing. Accordingly, the printer 3 has a communication section 34 to transmit and receive various kinds of messages via the Internet 4 in addition to standard elements of a printer such as a controller 31 provided with a CPU, a ROM, a RAM, or a printing section 35. The communication section 34 converts signals received from the Internet 4 via a LAN in accordance with a protocol and sends to an internal bus, and also converts signals obtained from the internal bus in accordance with a protocol and sends to the Internet via the LAN. The ROM of the controller 31 stores various kinds of computer programs such as a communication program or a print program to be read in the RAM and be executed by the CPU. Various kinds of functions of the printer 3 are achieved by causing the CPU to execute these computer programs.

The communication program is a program for communicating with the server 2 in accordance with a communication protocol such as TCP/IP, HTTP, or XMPP. The controller 31 acquires information necessary for connecting with the server 2 using HTTP or XMPP in advance. A receiving buffer 32 (that corresponds to the first storing section) is a memory for storing the processing data that is received by the controller 31 for executing the communication program from outside through the communication section 34, and a memory for storing various data such as print data once. The controller 31 for executing the communication program and the communication section 34 correspond to the "requesting section" that issues a request to transmit print data to the server 2. The controller 31 for executing the communication program, the communication section 34, and the receiving buffer 32 correspond to the "receiving section" that receives print data transmitted from the server 2.

The print program is a program that reads out print data stored in the receiving buffer 32, forwards it to a processing buffer 33 (that corresponds to the second storing section), converts the print data into data of a form suitable for printing in the printer 3 by conducting processing before printing, and conducts printing by controlling the printing section 35 based on data after the conversion. The controller 31 for executing the print program, the printing section 35, and the processing buffer 33 correspond to the "print processing section". In the present embodiment, print data generated by the server 2 and transmitted to the printer 3 is data in which pixel values are expressed by an RGB method. In such a case, processing before printing refers to resolution conversion processing, color conversion processing (processing for converting into a tone value per ink installed in the printer 3), halftone processing, sorting processing, and the like, to be applied to print data of such a form. The processing buffer 33 is a memory for storing data before processing, during processing, or after processing when the above-described processing before printing is conducted to the print data that is extracted and read out from various data stored in the receiving buffer 32. Buffer memories provided respectively for data passing in each of the above-described processing included in the processing before printing are collectively referred to as the processing buffer 33.

Figure 2:
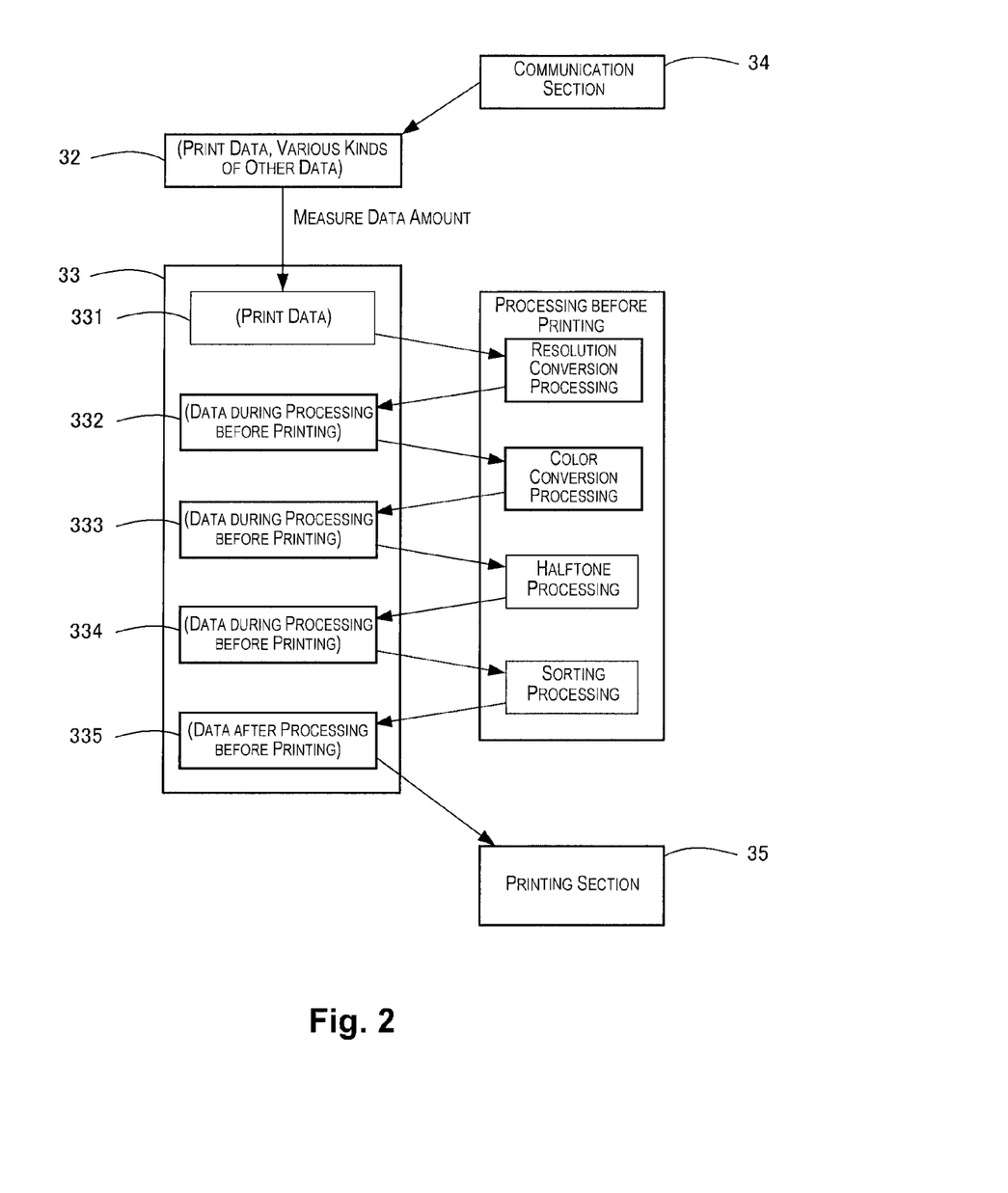
FIG. 2 is a diagram showing a configuration example of a buffer according to the first embodiment.

FIG. 2 is a diagram explaining each buffer. As shown in FIG. 2, in the present embodiment, the processing buffer 33 includes a first processing buffer 331 that stores print data before resolution conversion processing that is read out from the receiving buffer 32; a second processing buffer 332 that stores data before color conversion processing and after resolution conversion processing; a third processing buffer 333 that stores data before halftone processing and after color conversion processing; a fourth processing buffer 334 that stores data before sorting processing and after halftone processing; and a fifth processing buffer 335 that stores data after sorting processing. Data stored in the fifth processing buffer 335 is used for printing by the printing section 35. The controller 31 for executing the print processing program reads out the print data stored in the receiving buffer 32 from the receiving buffer 32 and forwards it to the processing buffer 33 (the first processing buffer 331), which makes it a "processing object" by the "print processing section". The print data read out from the receiving buffer 32 and forwarded to the processing buffer 33 (the first processing buffer 331) is deleted from the receiving buffer 32 so as to create a storing area for newly-received data. The print program has a function of measuring an accumulated data amount of forwarded print data as a size "n" every time the print program forwards print data from the receiving buffer 32 to the processing buffer 33. The controller 31 for executing the print program corresponds to the "measuring section".

When resolution conversion processing is completed to the print data stored in the first processing buffer 331, the controller 31 writes the data after processing in the second processing buffer 332 and deletes the print data from the first processing buffer 331. The controller 31 then reads out subsequent print data from the receiving buffer 32 and forwards it to the first processing buffer 331. Likewise, regarding the second processing buffer 332 to the fifth processing buffer 335, when the controller 31 reads out data from the buffer of the previous stage, conducts processing to the data, and finishes writing the data in the buffer of the subsequent stage, the controller 31 deletes the data from the buffer of the previous stage and creates a state where subsequent data can be forwarded to the buffer of the previous stage. The printing section 35 has an actuator, a sensor, a drive circuit, and machine components for conducting printing to a printing medium such as photo paper, plain paper, OHP sheets by a well-known printing method such as a ink jet method or a laser method. The print data that corresponds to a portion where printing has been completed by the printing section 35 is deleted from the processing buffer 33 (the fifth processing buffer 335).

1-2. Print Sequence

In the printing system shown in FIG. 1, when an e-mail with an attached file is transmitted from the communication terminal 1 to an e-mail address associated with the printer 3, it is desired that the attached file is immediately printed in the printer 3. Also, in terms of load on the server 2 and network traffic, it is not desired that polling is conducted to the server 2 by using a message based on HTTP in order for the printer 3 to immediately acquire a print request. Thus, the printer 3 receives notice of presence of a print job based on XMPP from the server 2. Since XMPP is a so-called push-type protocol that can transmit messages bi-directionally, the printer 3 does not need polling of the server 2. When the power of the printer 3 is on, an XMPP connection is always established between the server 2 and the printer 3 unless a communication error or another error occurs.

Figure 3:
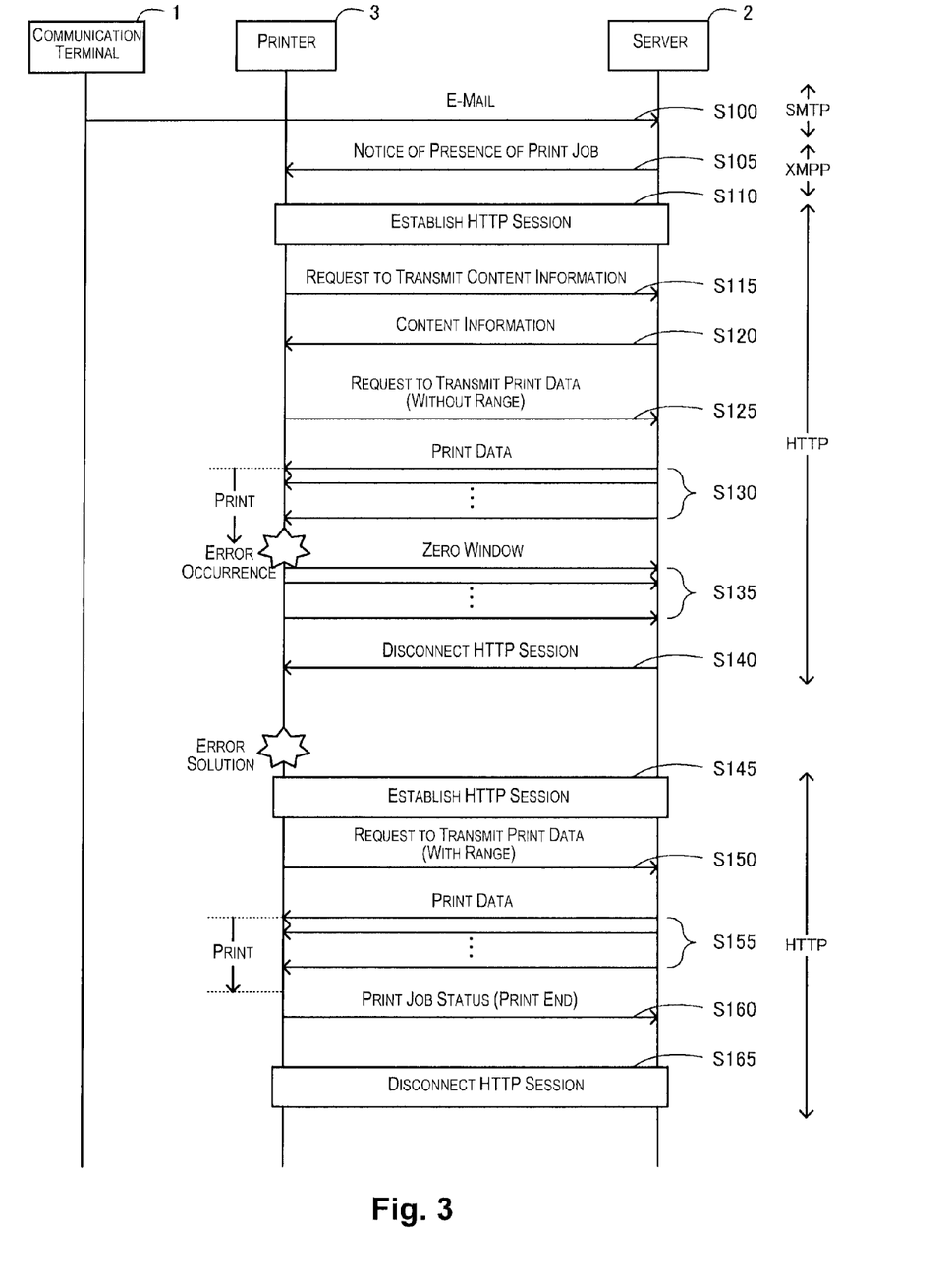
FIG. 3 is a sequence chart of a print sequence according to the first embodiment.

FIG. 3 is a sequence chart of a print sequence according to the present embodiment. More specifically, it is a sequence chart in a case where an error occurs in the printer 3 before the printer 3 acquires all print data included in a print job and forwards it to the processing buffer 33. In the sequence chart of FIG. 3, for clarification of the main part of the invention, the details of the sequence of establishing or disconnecting a session, and an ACK packet or a FIN packet in response to each communication will not be described except for a part pertinent to the invention.

First, the server 2 receives an e-mail transmitted from the communication terminal 1 to an e-mail address associated with the printer 3 (S100). Then, the server 2 generates print data by conducting rendering to a print object such as an attached file based on the e-mail, and transmits notice of presence of a print job to the printer 3 by using XMPP (S105). When the communication section 34 receives the notice of presence of a print job transmitted from the server 2 by using XMPP, the communication section 34 establishes an HTTP session with respect to the server 2 (S110), and transmits a request to transmit content information to the server 2 by a "get" request of HTTP (S115). When the server 2 receives the request to transmit content information transmitted from the printer 3, the server 2 transmits content information of the print job to the printer 3 (S120). Here, content information includes information on print data included in a print job such as a URI from which the print data is downloaded or a document format of the print data. The content information is stored in the receiving buffer 32 through the communication section 34. The controller 31 analyzes the data stored in the receiving buffer 32 and acquires the content information. After the acquisition of the content information, the controller 31 deletes the content information from the receiving buffer 32.

Next, the controller 31 transmits a request to transmit print data to the server 2 by a "get" request of HTTP (S125). The URI from which the print data is downloaded is included in the content information acquired by the printer 3 in S120. Incidentally, in S125, a request to transmit is conducted to the entire print data included in the print job notified in S105. The server 2 transmits print data to the printer 3 by using HTTP from the beginning by a predetermined size in response to the request to transmit from the printer 3 (S130). The print data transmitted in S130 is transmitted to the printer 3 in a form of being included in a response message with respect to the "get" request of S125. The HTTP header included in the response message includes information showing the size (size "M") of the entire print data transmitted to the printer 3 (Content-Length Header).

The print data transmitted from the server 2 is stored in the receiving buffer 32 by the communication section 34 and the controller 31 for executing the communication program. The size M of the entire print data described above is also stored in the receiving buffer 32. The controller 31 analyzes the data in the receiving buffer 32, and acquires and stores the size "M". The stored size "M" is deleted by the controller 31 when printing of the print data is completed. Subsequently, the controller 31 forwards the print data stored in the receiving buffer 32 to the processing buffer 33 (the first processing buffer 331) if a space is available in the processing buffer 33 (the first processing buffer 331), and measures an accumulated data amount of the forwarded print data (size "n"). The print data forwarded to the processing buffer 33 is deleted from the receiving buffer 32. The data amount (size "n") is measured by a single print job (When printing of a single print job is completed, the value of the size "n" is reset). The controller 31 conducts processing before printing to the print data forwarded to the processing buffer 33. The controller 31 conducts printing by controlling the printing section 35 based on the data to which processing before printing has been conducted. A portion of data in the processing buffer 33 in which printing has been completed is deleted.

Hereinafter, a sequence will be explained in a case where an error occurs in the printer 3 while the controller 31 repeats steps of receiving print data, forwarding print data from the receiving buffer 32 to the processing buffer 33, measuring an amount of forwarded data, processing before printing, and conducting printing. The assumed error of this case, for example, is a relatively minor degree of error such as out of printing paper and out of ink in which no problem will occur even if a user starts printing again where the printing stopped after the error is solved. When an error occurs in the printer 3, printing cannot be continued in the printer 3, and thus the controller 31 ceases the printing operation. The controller 31 leaves the data in the processing buffer 33 without deleting in preparation to start the printing again. Since no space is created in the processing buffer 33, the controller 31 does not forward the print data in the receiving buffer 32 to the processing buffer 33. Consequently, the receiving buffer 32 is filled with data including print data that is received from the server 2 one after another and is not a processing object of the processing before printing, and the receiving buffer 32 is placed in a state where it cannot receive subsequent print data.

In order to notify the server 2 of this state, the controller 31 sets the window size to "0" in an ACK packet corresponding to the transmission of the print data from the server 2 in S130, and transmits it to the server 2 (S135). This state is referred to as a zero window state. When the server 2 determines that the zero window state continues for a predetermined period of time (for example, 5 minutes), the server 2 transmits data to disconnect the HTTP session (S140). Specifically, for example, the server 2 transmits an RST (Reset) packet to the printer 3. As a result, the session between the printer 3 and the server 2 is disconnected. When the session is disconnected, the controller 31 deletes the print data stored in the receiving buffer 32.

Since the time when the error is solved and the printing can be started again is unknown, maintaining the HTTP session until the time comes becomes load to the server 2. Specifically, a memory region to be secured per session cannot be released for a long period of time, which causes delay in conducting printing since an e-mail transmitted from another communication terminal is received. In order to prevent this delay, the session between the sever 2 and the printer 3 is disconnected once.

When the controller 31 detects solution of the error in the printer 3, the controller 31 starts processing before printing or printing by using the print data stored in the processing buffer 33. Also, the controller 31 establishes an HTTP session with respect to the server 2 again in response to the detection of solution of the error (S145), and transmits a request to transmit print data to the server 2 (S150). In a case of the request to transmit print data in S150, that is, the request to transmit print data after solution of an error, the controller 31 issues a request to transmit by specifying the URI from which the print data is downloaded at the time of the occurrence of the error, and the range showing the remaining portion of the print data except the print data that is already made a processing object of the processing before printing based on the value of the amount (size "n") of the data forwarded to the processing buffer 33. Since the print data received from the server 2 and stored in the receiving buffer 32 is deleted at the time of disconnecting the session, a portion of the print data stored in the receiving buffer 32 is made an object to be acquired again. Specifically, when size "M">size "n">0 is satisfied in a comparison between the size "M" of the entire print data and the size "n", the controller 31 specifies the range of print data having a size of (size "M"—size "n") from a position subsequent to data of the size "n" from the beginning of the print data up to the end of the print data (position of size "M").

Figure 5:
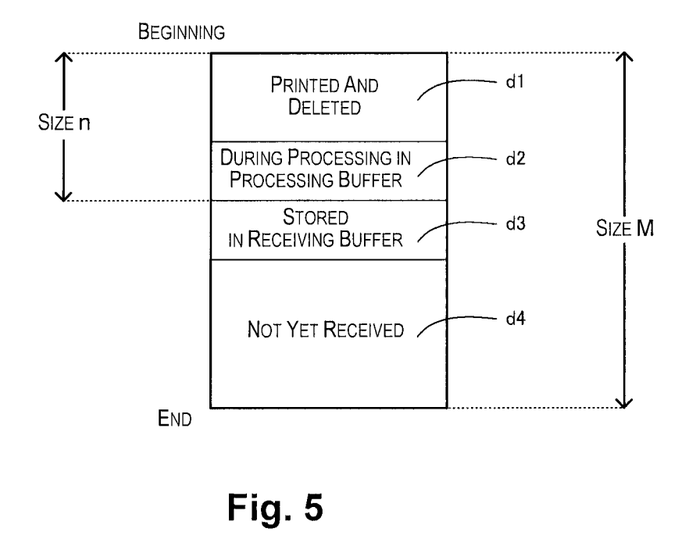
FIG. 5 is a diagram explaining a state of each portion of print data according to the first embodiment.

FIG. 5 is a diagram showing print data included in a single print job, and is a diagram explaining an example of a state of print data at the time of the occurrence of an error in the printer 3. In this example, print data is separated into four portions from the beginning, and referred to as d1, d2, d3 and d4 in order from the beginning. The print data is transmitted from the server 2 in order from the beginning, stored in the receiving buffer 32 in order, and forwarded to the processing buffer 33 to undergo processing before printing. The print data is then printed and deleted. When the error occurs, the print data d1 of a predetermined size from the beginning among the print data is data that is already printed and deleted from the processing buffer 33. The print data d2 subsequent to the print data d1 is data that has been forwarded to the processing buffer 33 and is in the process of processing before printing or in the process of printing. The print data d3 subsequent to the print data d2 is data that is stored in the receiving buffer 32 and is not yet forwarded to the processing buffer 33. The print data d4 subsequent to the print data d3 is data that is not yet received by the printer 3. If the error occurs at the time of this state, the controller 31 sets the portions of the print data d3 and the print data d4 a range to be specified in a request to transmit print data in S150. Accordingly, when the error is solved, processing before printing or printing is started again with respect to the print data d2, and the print data d2 is deleted from the processing buffer 33 after completion of the printing. The print data d3 and the print data d4 are transmitted from the server 2 to the printer 3, and processing before printing and printing are conducted.

The server 2 transmits a requested portion of the print data to the printer 3 (S155). When the controller 31 of the printer 3 receives the print data and stores it in the receiving buffer 32, the controller 31 of the printer 3 forwards it to the processing buffer 33, conducts processing before printing, and conducts printing in the same manner as described above. When printing corresponding to a single print job is completed, the server 2 is notified of the completion of the printing as a print job status (S160), and the server 2 disconnects the session with respect to the printer 3 in a case where there is no other print job to the printer 3 (S165). Incidentally, in a case where another error occurs after the printing is started again, the window size is set to "0" in an ACK packet corresponding to the transmission of the print data from the server 2, and transmits it to the server 2 in the same manner as in S135. The operations of S140 and the following steps are then repeated.

As explained above, according to the present embodiment, if the session with respect to the server 2 is disconnected in a state where forwarding of print data to the processing buffer 33 is not completed and thereafter the session is reconnected, a request to transmit is not conducted to the print data that is already forwarded to the processing buffer 33 and made a processing object of processing before printing (during the processing or after the processing), and a request to transmit is conducted to the print data that is not yet forwarded to the processing buffer 33 and is not yet made a processing object of processing before printing. It is thus possible to prevent printing from being conducted by conducting processing before printing again to a portion of print data that is already printed or during processing before printing. As a result, printing can be restarted where the printing has been ceased, which makes it possible to prevent consumable goods such as ink or a printing medium from being wasted. Also, since the printing is restarted where the printing has been ceased, the time required for the printing to be completed can be shortened compared to a case where printing is conducted again from the beginning.

2. Second Embodiment

Figure 4:
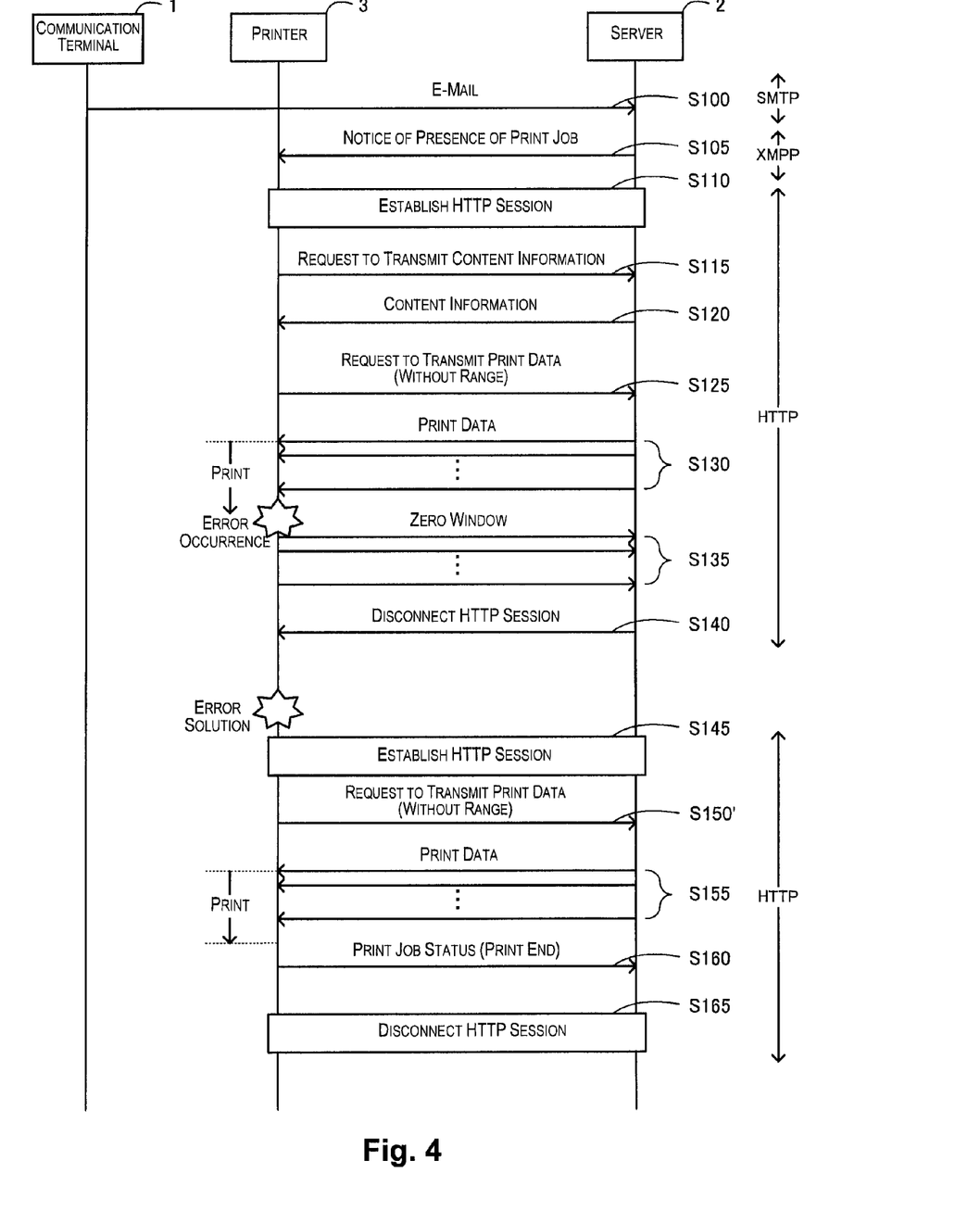
FIG. 4 is a sequence chart of a print sequence according to a second embodiment.

The second embodiment is an embodiment in which the server 2 does not correspond to range specification by using a range header. Hereinafter, the second embodiment will be explained, but explanations of the same points as the first embodiment will be omitted appropriately. FIG. 4 is a sequence chart of a print sequence according to the present embodiment, and the operations of S150' and the following steps are different from the first embodiment.

In S150', in the same manner as in S125, the controller 31 transmits a request to transmit the entire print data included in a print job to the server 2. The server 2 transmits the print data to the printer 3 in order from the beginning in response to the request to transmit print data from the printer 3 (S155). The controller 31 of the printer 3 stores the print data transmitted from the server 2 in the receiving buffer 32 in the same manner as in S130.

The print data is stored in the receiving buffer 32 from the beginning of the print data shown by a print job notified in S105. The controller 31 deletes the print data having a size of the measured data amount (size "n") from the beginning of the print data shown by the print job, that is, the print data already forwarded to the processing buffer 33, without forwarding it to the processing buffer 33. When the controller 31 receives print data that is not yet forwarded to the processing buffer 33 as a processing object of processing before printing, the controller 31 does not delete it from the receiving buffer 32. After a space opens up in the processing buffer 33, the controller 31 forwards the print data to the processing buffer 33 and makes it a processing object of processing before printing.

When print data is transmitted from the server 2 from the beginning in S155, the controller 31 deletes print data of the size "n" from the receiving buffer 32 from the beginning, and does not forward it to the processing buffer 33. When print data of the print data d3 and subsequent data are received by the receiving buffer 32, the print data from the print data d3 to the end of the print data is forwarded to the processing buffer 33 in order. The controller 31 conducts processing before printing and then conducts printing to the print data forwarded to the processing buffer 33 in the same manner as described above. Consequently, when the error is solved, processing before printing or printing is started again with respect to the print data d2, and the print data d2 is deleted from the processing buffer 33 after completion of the printing. The print data d3 and the print data d4 are transmitted from the server 2 to the printer 3, and processing before printing and printing are conducted.

Subsequently, in the same manner as in the first embodiment, when printing corresponding to a single print job is completed, it moves on to the operation of S160 to notify the server 2 of the completion of the printing as a print job status.

As described above, according to the present embodiment, if the session with respect to the server 2 is disconnected in a state where forwarding of print data to the processing buffer 33 is not completed and thereafter the session is reconnected, a portion of the print data that is already forwarded to the processing buffer 33 and made a processing object of processing before printing (or a portion of the print data that is deleted after printed) among the received print data is not forwarded to the processing buffer 33 again. The print data that is not yet forwarded to the processing buffer 33 and is not yet made a processing object of processing before printing is extracted, forwarded to the processing buffer 33, and made a processing object of processing before printing. It is thus possible to prevent printing from being conducted by conducting processing before printing again to a portion of print data that is already printed or during processing before printing.

3. Third Embodiment

The third embodiment is an embodiment in which processing is changed based on a kind of error. Hereinafter, the third embodiment will be explained, but explanations of the same points as the first embodiment and the second embodiment will be omitted appropriately.

Figure 6:
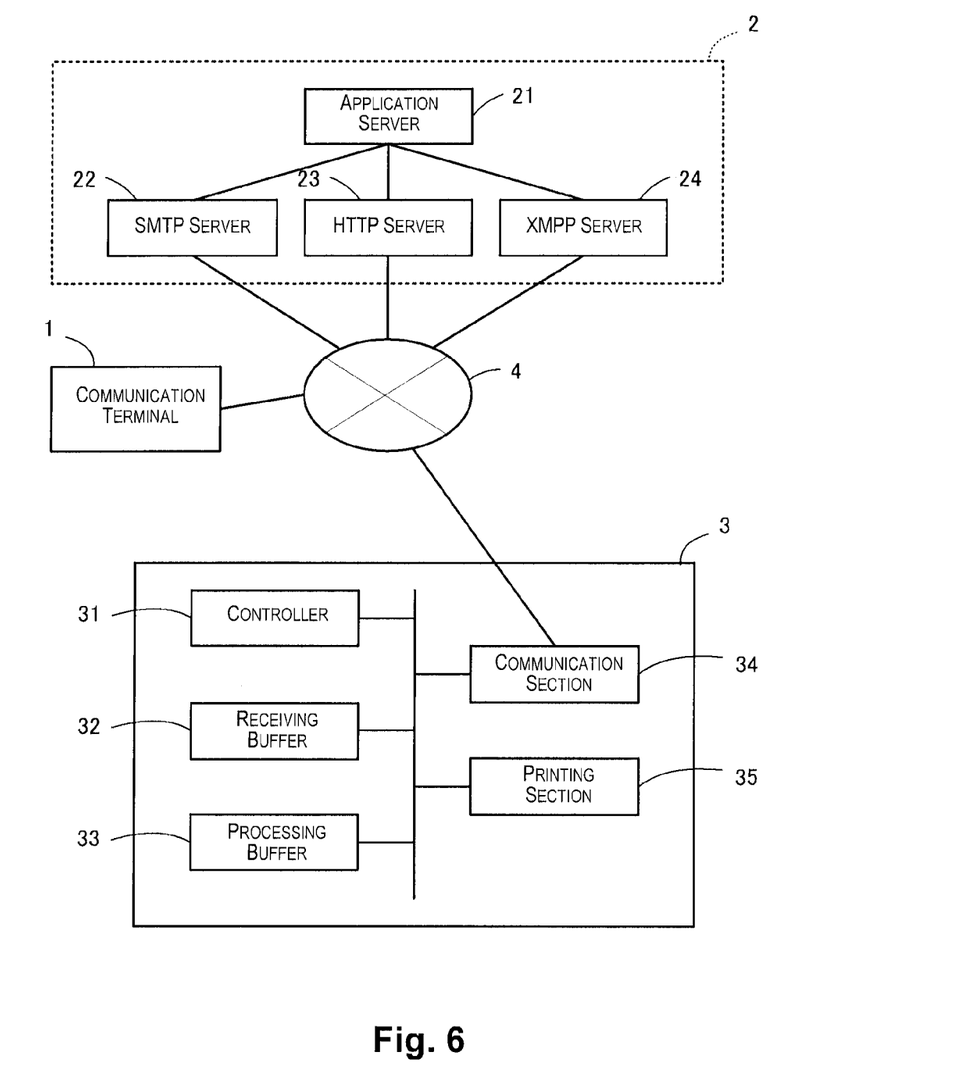
FIG. 6 is a block diagram of a data processing device according to a third embodiment.

FIG. 6 is a block diagram showing a configuration of the entire printing system including the printer (data processing device, printing device) 3 and the server 2 according to the present embodiment.

The server 2 is constructed of four or more computers including an application server 21, an SMTP server 22, an HTTP server 23, and an XMPP server 24. Each of the application server 21, the SMTP server 22, the HTTP server 23, and the XMPP server 24 has a CPU, a RAM, a ROM, a hard disk device, a communication section, and an internal interface for connecting these, that are not shown in the drawing. The communication section converts signals received from the Internet via a LAN in accordance with a protocol and sends to an internal bus, and also converts signals obtained from the internal bus in accordance with a protocol and sends to the Internet via the LAN.

The SMTP server 22 sends and receives an e-mail addressed to an e-mail address assigned to the printer 3 registered in the application server 21 based on SMTP (Simple Mail Transfer Protocol). The HTTP server 23 has a function of communicating with the printer 3 based on HTTP (Hyper Text Transfer Protocol), and serves as the "transmitting section" that transmits print data to the printer 3. The XMPP server 24 has a function of communicating with the printer 3 based on XMPP (Extensible Messaging and Presence Protocol), and transmits notice of presence of a print job to the printer 3. The XMPP server 24 can be a server that communicates by using a protocol such as Telnet or Web Socket instead of XMPP. When the application server 21 receives an e-mail based on SMTP, the application server 21 generates print data for the corresponding printer 3 based on the e-mail, stores it in a memory (that corresponds to the "storing section") of the server 2, transmits notice of presence of a print job to the corresponding printer 3 based on XMPP, and transmits the generated print data to the printer 3 in response to a request to transmit from the printer 3 based on HTTP.

Figure 7:
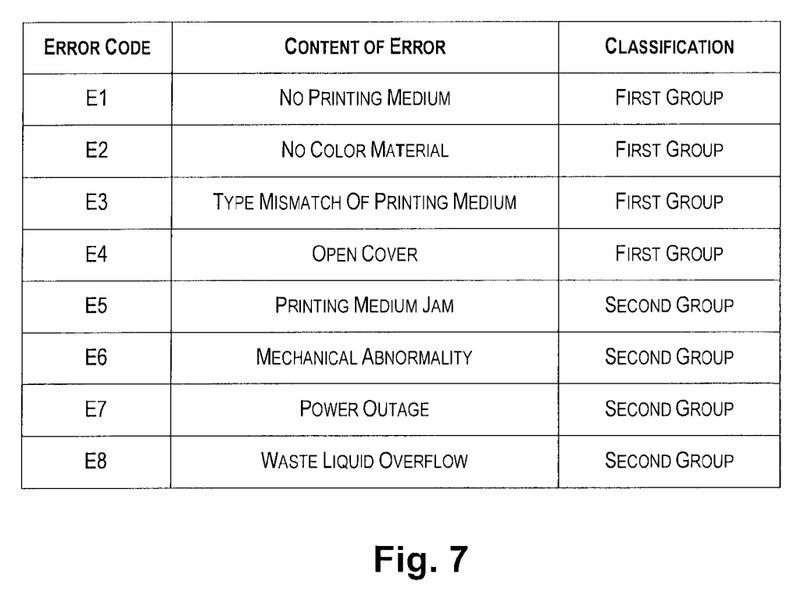
FIG. 7 is a diagram showing classification of errors according to the third embodiment.

FIG. 7 is a diagram showing an example of a correspondence relation among the contents of errors identified in the printer 3, error codes, and groups into which the errors are classified. The error codes and the groups into which the errors are classified are stored corresponding to each other in the ROM of the controller 31. "No printing medium" is an error in which printing cannot be conducted because a predetermined printing medium is not set in the printer 3. "No color material" is an error in which printing cannot be conducted because there is no color material (recording agent) used for printing such as ink or toner. A "type mismatch of a printing medium" is an error in which the kind of printing medium such as photo paper or plain paper designated, for example, in a print job and the kind of printing medium set in the printer 3 do not match. "Open cover" is an error in which printing cannot be conducted because a movable cover that covers a case body in which machine components for conducting printing operation such as a print head are accommodated is in an open state. The above-described errors are an error in which it is preferable to restart printing where the printing has been ceased after the error is solved. The above-described errors are thus classified into the "first group" as a group of errors in which printing is restarted where the printing has been ceased.

A "printing medium jam" is an error in which printing cannot be conducted because a printing medium is jammed in a feeding route of the printing medium. "Mechanical abnormality" is an error in which printing cannot be conducted because some sort of mechanical abnormality occurs in the printer 3. A "power outage" is an error in which printing cannot be conducted because no power is supplied. These errors are an error in which it is preferable to conduct printing again from the beginning after the error is solved. These errors are thus classified into the "second group" as a group of errors in which printing is conducted again from the beginning.

Figure 8:
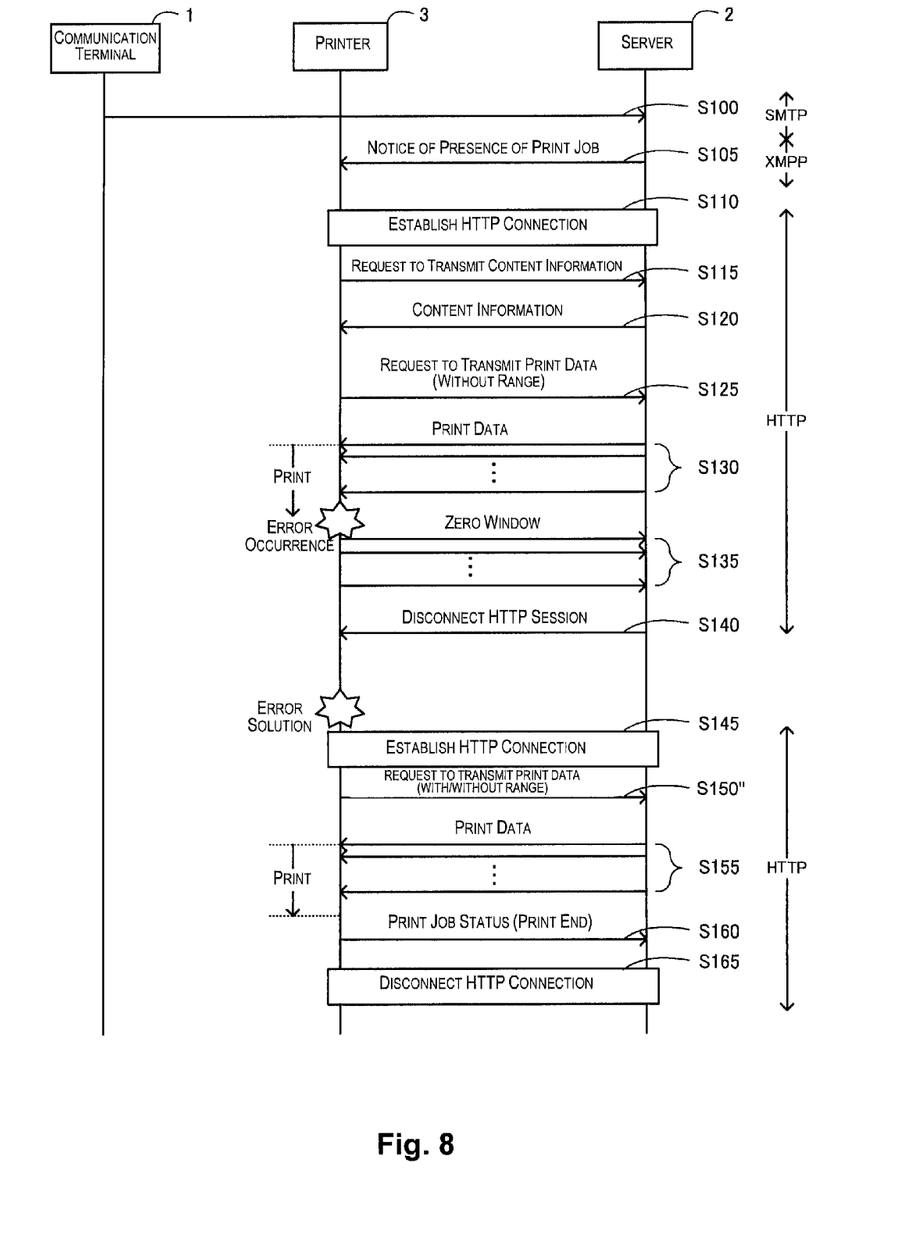
FIG. 8 is a sequence chart of a print sequence according to the third embodiment.

FIG. 8 is a sequence chart of a print sequence according to the present embodiment, and the operations of S150" and the following steps are different.

In S150", the controller 31 transmits a request to transmit print data to the server 2. In S150", the content of the occurring error is identified, and a mode of the request to transmit print data is switched corresponding to the content of the error. Specifically, in a case where the error is classified into the first group, a request to transmit is issued with range specification of conducting printing again from where the printing has been ceased due to the error. In a case where the error is classified into the second group, a request to transmit is issued to the entire print data again.

In a case of the error of the first group (conducting range specification), the operations are conducted in the same manner as the first embodiment. Specifically, when the controller 31 detects solution of the error, the controller 31 restarts processing before printing or printing by using the print data stored in the processing buffer 33.

The controller 31 issues a request to transmit by specifying the URI from which the print data is downloaded at the time of the occurrence of the error, and the range showing the remaining portion of the print data except the print data that is already made a processing object of processing before printing based on the value of the amount (size "n") of the data forwarded to the processing buffer 33. When the controller 31 of the printer 3 receives the print data and stores it in the receiving buffer 32, the controller 31 of the printer 3 forwards it to the processing buffer 33, conducts processing before printing, and conducts printing in the same manner as described above. Consequently, when the error is solved, processing before printing or printing is started again with respect to the print data d2, and the print data d2 is deleted from the processing buffer 33 after completion of the printing. The print data d3 and the print data d4 are transmitted from the server 2 to the printer 3, and processing before printing and printing are conducted. It can be possible to conduct the operations in the same manner as in the second embodiment.

Next, a case of the error of the second group (acquiring the entire data again) will be explained. In a case where the occurring error is classified into the second group, the controller 31 deletes data before processing before printing, during processing, or after processing stored in the processing buffer 33, and a request to transmit is conducted to the entire print data included in a print job in the same manner as in S125 (S150"). Specifically, referring to FIG. 5, the controller 31 issues a request to transmit the print data d1, d2, d3 and d4. The server 2 sequentially transmits the entire print data (d1, d2, d3 and d4) included in the print job to the printer 3 in response to the request to transmit from the printer 3 (S155). The controller 31 of the printer 3 sequentially stores the print data transmitted from the server 2 in the same manner as in S130, forwards the print data shown by the print job from the beginning of the print data d1 that is the first portion of the print data to the processing buffer 33, and conducts processing before printing and printing. When the error is solved, therefore, the printing is conducted again from the beginning. In a case where a print job includes a plurality of pages, it can be possible to disregard data of a page that has successfully been printed, and restart printing from the beginning of a page that has failed to be printed due to the occurrence of an error.

Subsequently, when printing corresponding to a single print job is completed, the server 2 is notified of the completion of the printing as a print job status (S160), and the server 2 disconnects the HTTP session with respect to the printer 3 in a case where there is no other print job to the printer 3 (S165). Incidentally, in a case where another error occurs after the printing is started again, the window size is set to "0" in an ACK packet corresponding to the transmission of the print data from the server 2, and transmits it to the server 2 in the same manner as in S135. The operations of S140 and the following steps are then repeated.

As explained above, according to the present embodiment, it is possible to switch the mode of a request to transmit print data depending on the content of the occurring error when the session is reconnected. In a case of an error in which it is preferable to restart printing where the printing has been ceased, a request to transmit is not conducted to the print data that is already forwarded to the processing buffer 33 and made a processing object of processing before printing (during the processing or after the processing). A request to transmit is conducted to the print data that is not yet forwarded to the processing buffer 33 and is not yet made a processing object of processing before printing. It is thus possible to prevent printing from being conducted by conducting processing before printing again to a portion of print data that is already printed or during processing before printing. As a result, printing can be restarted where the printing has been ceased, which makes it possible to prevent consumable goods such as ink or a printing medium from being wasted. Also, since printing is restarted where the printing has been ceased, the time required for the printing to be completed can be shortened compared to a case where printing is conducted again from the beginning. On the other hand, in a case of an error in which it is preferable to conduct ceased printing again from the beginning, after the session is reconnected, a request to transmit is conducted again to the server with respect to the entire print data, and the entire print data is received again from the server. Processing before printing is then conducted to the print data in order from the beginning, and the entire print data included in the print job is printed again.

4. Fourth Embodiment

The technical scope of the invention is not limited to the above-described embodiments, and various modifications can be possible without departing from the subject matter of the invention. The server can be constructed of a physically single device provided with all functions, or the server can be constructed of physically plural devices in which the plural devices cooperate with each other to provide each function.

For example, in the above-described embodiments, the data processing device is applied to a printer. However, the data processing device can be applied to various devices that request processing data to a server and conduct some sort of processing by using the processing data acquired from the server. For example, the data processing device can be applied to a game machine that receives game data from a server and provides a game.

Also, in the first embodiment, the server 2 corresponds to range specification by using an HTTP range header, and print data according to the range specification requested by the printer 3 is transmitted to the printer 3. In the second embodiment, the server 2 does not correspond to range specification by using an HTTP range header, and all the print data requested by the printer 3 is transmitted to the printer 3. However, there can be cases where the printer 3 does not know whether the server 2 corresponds to range specification by using a range header or not. In such cases, although the printer 3 issues a request to transmit print data with range specification in the same manner as in the first embodiment in S150 of FIG. 3 explained in the first embodiment, the server 2 notifies the printer 3 of information showing that the server 2 does not correspond as an HTTP status code, and transmits the entire print data included in the print job. As the status code, the server 2 issues "206" in a case of transmitting a portion of the print data according to range specification, and issues "200" in a case of transmitting the entire print data without responding to range specification. The controller 31 makes a determination with respect to the status code issued from the server 2 in response to a request to transmit with range specification. In a case where the status code shows that a portion of the print data according to range specification is transmitted, that is, the status code is "206", similar operations of S155 and the following steps of the above-described first embodiment are conducted. On the other hand, in a case where the status code shows that the entire print data is transmitted without responding to range specification, that is, the status code is "200", similar operations of S155 and the following steps of the above-described second embodiment are conducted. The same process can be conducted in the third embodiment.

Figure 9:
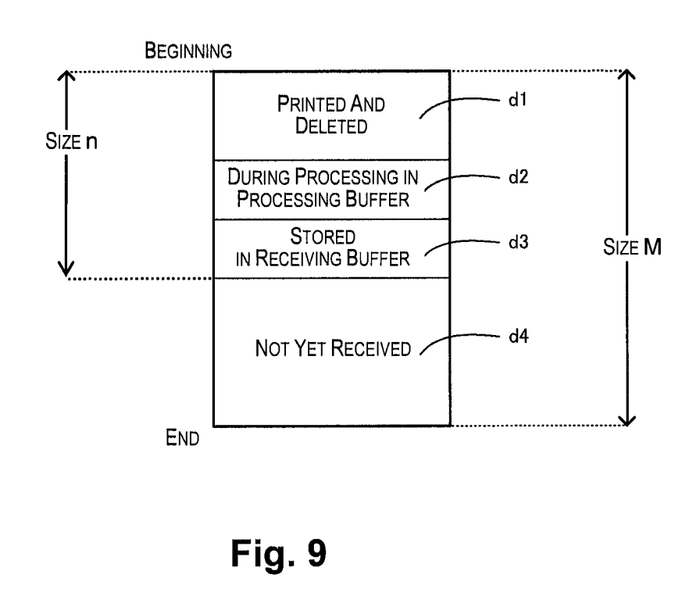
FIG. 9 is a diagram explaining a state of each portion of print data according to another embodiment.

In the above-described embodiments, when print data is forwarded from the receiving buffer 32 to the processing buffer 33, an accumulated data amount of the forwarded print data is counted (see FIG. 2). However, print data can be considered to become a processing object of the "print processing section" when the print data is stored in the receiving buffer 32, and an accumulated data amount of the stored print data can be counted when the print data is stored in the receiving buffer 32. In this case, the controller 31 for executing the communication program and the communication section 34 correspond to the "receiving section", and the controller 31 for executing the print program, the receiving buffer 32 and the processing buffer 33 correspond to the "print processing section". FIG. 9 is a diagram explaining a state of print data in this case. Referring to FIG. 9, the size "n" corresponds to the size in which d1, d2, and d3 are combined. When an error occurs in the state shown in FIG. 9, and print data is requested with range specification after a reconnection is established, range specification is conducted to the portion of the print data d4. If the entire print data is transmitted from the server 2, the portions of the print data d1-d3 are stored in the receiving buffer 32 once, and then deleted from the receiving buffer 32. Subsequently, the portion of d4 is stored in the receiving buffer 32. In a case of this modification example, the controller 31 does not delete the print data d3 in the receiving buffer 32 even if the session is disconnected in S140.

Also, regarding the data (print data d2 of FIG. 5 or FIG. 9) existing in the processing buffer 33 at the time of the occurrence of an error, processing before printing can be completed before the error is solved, and the data can be stored in the fifth processing buffer 335 that is the last stage of the processing buffer 33. In this case, when the error is solved, printing can be conducted to the print data d2 without conducting processing before printing, and thus the print time can be shortened. Processing before printing or printing can be restarted to the data (print data d2 of FIG. 5 or FIG. 9) existing in the processing buffer 33 at the time of the occurrence of an error after subsequent data (print data d3 of FIG. 5 or FIG. 9) is transmitted from the server 2.

The configuration of the buffer (FIG. 2) explained in the above-described embodiment is only one example, and the invention is not limited to this. Part or all of the processing before printing shown in the above-described embodiments can be conducted by the server 2. Also, the server 2 can notify the printer 3 of an object to be printed to which rendering has not yet conducted, so that the printer 3 can generate print data by conducting rendering to the object to be printed and conduct processing before printing to the print data. Accordingly, the format of the print data transmitted from the server 2 is not limited to the examples shown in the above-described embodiments.

In the third embodiment, the controller 31 switches the mode of a request to transmit depending on the content of an error. However, the controller 31 can issue a request to transmit print data that includes a range showing the remaining portion of the print data together with the content of an error. In this case, the server determines whether all of the print data should be transmitted or only part of the print data should be transmitted based on the content of an error transmitted together with the request to transmit. The server then transmits the print data based on the determination results.

Also, the errors and the classification shown in the above-described third embodiment are only examples. Other various errors can be classified into the first group or the second group. The errors shown in the above-described embodiment can not be included in the classification. The classification of the error shown in the above-described embodiment can be changed. For example, "waste liquid overflow" can be classified into the second group, and this is an error in which printing cannot be continued because a waste liquid exceeds an acceptable amount in a reservoir for a waste liquid of ink. Also, in a case where the cover of the printer 3 is locked during printing, the error of "open cover" is not detected (does not occur) during printing. Consequently, "open cover" does not need to be classified into either of the first group or the second group during printing. Further, "a power outage" can be classified into the first group, and printing can be restarted where the printing has been ceased after power distribution is back. Further, in a case of being applied to a game machine that receives game data from a server and provides a game, errors in a stage of an action game or a shooting game can be classified into the second group, and other errors can be classified into the first group.

In the above-described embodiments, a request to transmit content information—receiving and a request to transmit print data—receiving are conducted in a series of HTTP session. However, the HTTP session can be disconnected after a request to transmit content information—receiving (S115-S120 of FIG. 3) is conducted, and a new HTTP session can be established prior to a request to transmit print data (S125 of FIG. 3). A request to transmit print data—receiving can be conducted in this manner.

In the above-described embodiments, an error and a recovery from the error are explained. However, the invention is not limited to this, and can be applied to a case of a recovery from a cease caused by other than an error. In the case of the third embodiment, the reason of a cease can be classified into the first group or the second group.

What is claimed is:

1. A processing device comprising:
   a requesting section that issues a request to transmit processing data to a server;
   a receiving section that receives the processing data transmitted from the server in response to the request to transmit;
   a processing section that sequentially makes the processing data received by the receiving section a processing object, and conducts processing based on the processing data that is made a processing object; and
   a measuring section that measures a data amount of the processing data that has been made a processing object by the processing section among the received processing data, wherein
   in a case where a session between the server is disconnected before all the processing data is made a processing object and thereafter the session is reconnected, after the session is reconnected, the processing section conducts processing with respect to a first portion that is not yet made a processing object among the processing data based on the data amount have measured by the measuring section when the server is disconnected and does not conduct processing with respect to a second portion that is already made a processing object among the processing data.

2. The processing device according to claim 1, wherein in a case where a session between the server is disconnected before all the processing data is made a processing object and thereafter the session is reconnected, the requesting section issues a request to transmit the first portion that does not include the second portion based on the data amount measured by the measuring section after the session is reconnected.

3. The processing device according to claim 2, wherein in a case where the processing data received after the session is reconnected is the first portion only, the processing section makes the portion of the processing data a processing object, and in a case where the processing data received after the session is reconnected includes the first portion and the second portion, the processing section extracts the first portion from the received processing data based on the data amount measured by the measuring section and makes the first portion a processing object.

4. The processing device according to claim 1, wherein in a case where a session between the server is disconnected before all the processing data is made a processing object and thereafter the session is reconnected, the processing section extracts the first portion based on the data amount measured by the measuring section from the processing data received by the receiving section in response to the request to transmit the processing data issued again by the requesting section, and makes the first portion a processing object.

5. The processing device according to claim 1, wherein in a case where the processing section ceases to acquire the processing data before the acquisition of the processing data is completed and thereafter the processing data is acquired again, the processing section conducts processing to the first portion when the reason why the acquisition of the processing data is ceased is classified into a first group, and the processing section conducts processing to the first portion and the second portion when the reason why the acquisition of the processing data is ceased is classified into a second group.

6. The processing device according to claim 1, wherein the receiving section causes a first storing section to store the received processing data, the processing section conducts processing before processing to the processing data stored in a second storing section as the processing object and conducts processing based on the data after processing before processing, and the measuring section measures the data amount of the processing data forwarded from the first storing section to the second storing section.

7. The processing device according to claim 1, wherein the requesting section issues a request to transmit a portion of the processing data that is not yet made a processing object through range specification by using a range header of HTTP.

8. The processing device according to claim 1, wherein the processing data is print data, and the processing section is a processing section that conducts printing based on the acquired print data.

9. The processing device according to claim 5, wherein the processing data is print data, the processing section is a processing section that conducts printing based on the acquired print data, the reason classified into the first group is the occurrence of at least any one of errors including no printing medium, no color material, a type mismatch of a printing medium and open device cover, and the reason classified into the second group is the occurrence of at least any one of errors including a printing medium jam, mechanical abnormality of the processing section and a power outage.

10. A processing method comprising:
    issuing a request to transmit processing data to a server;
    receiving the processing data transmitted from the server in response to the request to transmit;
    sequentially making the processing data received by the receiving section a processing object, and conducts processing based on the processing data that is made a processing object; and
    measuring a data amount of the processing data that has been made a processing object by the processing section among the received processing data, wherein
    in a case where a session between the server is disconnected before all the processing data is made a processing object and thereafter the session is reconnected, in the processing step, after the session is reconnected, processing is conducted with respect to a first portion that is not yet made a processing object among the processing data based on the data amount have measured in the measuring when the server is disconnected, and processing is not conducted with respect to a second portion that is already made a processing object among the processing data.

11. A server comprising:
    a storing section that stores processing data to be processed by a data processing device; and a transmitting section that transmits the processing data to the data processing device, wherein in a case where the transmitting section ceases to transmit the processing data before completing transmission of the entire processing data and thereafter the transmitting section transmits the processing data again, the transmitting section transmits a portion of the processing data including a portion of the entire processing data that is not yet transmitted when the reason why the transmission of the processing data is ceased is classified into a first group, and transmits the entire processing data when the reason why the transmission of the processing data is ceased is classified into a second group.

* * * * *